United States Patent
Huang et al.

(10) Patent No.: US 9,887,729 B2
(45) Date of Patent: Feb. 6, 2018

(54) RF SUB-BAND DE-MULTIPLEXING FOR ULTRA-WIDE BAND OPTICAL DIGITAL COHERENT DETECTION

(71) Applicant: NEC Laboratories America, Inc., Princeton, NJ (US)

(72) Inventors: Yue-Kai Huang, Princeton, NJ (US); Shaoliang Zhang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 140 days.

(21) Appl. No.: 14/934,708

(22) Filed: Nov. 6, 2015

(65) Prior Publication Data

US 2016/0149661 A1    May 26, 2016

Related U.S. Application Data

(60) Provisional application No. 62/082,711, filed on Nov. 21, 2014.

(51) Int. Cl.
| | |
|---|---|
| *H04B 10/61* | (2013.01) |
| *H04B 1/7073* | (2011.01) |
| *H04J 14/02* | (2006.01) |

(52) U.S. Cl.
CPC ......... *H04B 1/7073* (2013.01); *H04B 10/616* (2013.01); *H04J 14/02* (2013.01)

(58) Field of Classification Search
CPC .................. H04B 10/611–10/6151
See application file for complete search history.

(56) References Cited

U.S. PATENT DOCUMENTS

| | | | | |
|---|---|---|---|---|
| 2012/0219294 A1* | 8/2012 | Huang | ............... | H04B 10/616 398/65 |
| 2012/0251112 A1* | 10/2012 | Sadot | ................. | H04B 10/616 398/65 |
| 2012/0294614 A1* | 11/2012 | Cvijetic | ............. | H04J 14/0282 398/67 |
| 2014/0169793 A1* | 6/2014 | Harley | ................ | H04B 10/548 398/79 |
| 2014/0341594 A1* | 11/2014 | Olsson | ................ | H04B 10/613 398/203 |
| 2015/0304049 A1* | 10/2015 | Huang | .............. | H04B 10/5165 398/115 |
| 2016/0191168 A1* | 6/2016 | Huang | .............. | H04Q 11/0001 398/45 |

* cited by examiner

*Primary Examiner* — Nathan Curs
(74) *Attorney, Agent, or Firm* — Joseph Kolodka

(57) ABSTRACT

Systems and methods are disclosed for receiving data by radio frequency (RF) mixing to down-convert in-phase and quadrature parts of a photo-detected electrical RF band signal to baseband for data conversion; controlling a mixing phase of a electrical local oscillator (LO) at one or more RF mixing modules; selecting one of the RF sub-bands to be down-converted to baseband after coherent photo-detection; and performing RF sub-band de-multiplexing for ultra-wide band optical digital coherent detection.

15 Claims, 3 Drawing Sheets

RF SUB-BAND DE-MULTIPLEXING FOR ULTRA-WIDE BAND OPTICAL DIGITAL COHERENT DETECTION

This application claims priority to Provisional Application Ser. No. 62/082,711 filed 2014 Nov. 21, the content of which is incorporated by reference.

BACKGROUND

The present invention relates to ultra-wide band optical digital coherent detection.

For networks where transmission performance isn't as critical as cost per transmitted bit, the number of optical carriers for a fixed data rate is very important as fewer parallel modulation/detection operations is required to implement the transponder, therefore reducing the cost. One good example is the cost advantage of a 2×200G DP-16QAM system compared to 4×100G DP-QPSK for 400G transponder implementation by using higher order modulation format. Another way to reduce the number of optical carriers is to increase the base band electrical baud rate or symbol rate that is modulated onto the optical carrier. With higher symbol rate per carrier, the number of analog components such coherent mixers, lasers, and photodiodes can be reduced at the receiver side, lowering the implementation cost. For digital coherent transmission, however, this will push the BW requirements for ADC on the receiver higher than what is available for the commercial DSP chip.

For digital coherent transmission, receiver side DSP is used to compensate fiber impairments such as chromatic dispersion, polarization rotation, polarization mode dispersion, and fiber nonlinearity. Thus the standard method of time domain multiplexing, which is commonly used in recent publication for high symbol rate generation at the transmitter side, cannot be used at the receive side. Thus almost all high baud-rate transmission systems in recent literature use very high bandwidth ADC, in the form of digital sampling oscilloscope, with BW>30-GHz to achieve signal conversion at the receiver side. These ADC bandwidth requirements are typically more than double of what is available in commercial DSP. Thus it would require huge investment from the chip designers to implement the new ADCs with compromise in power consumption. It is unclear that with the added cost and power consumption in DSP, these high baud-rate transmission technologies will still be competitive in metro and datacenter networks.

SUMMARY

In one aspect, RF sub-band demultiplexing at the receiver side using cascaded coherent mixers, balanced photodiodes, and RF IQ mixers is disclosed.

In another aspect, systems and methods are disclosed for receiving data by radio frequency (RF) mixing to down-convert in-phase and quadrature parts of a photo-detected electrical RF band signal to baseband for data conversion; controlling a mixing phase of a electrical local oscillator (LO) at one or more RF mixing modules; selecting one of the RF sub-bands to be down-converted to baseband after coherent photo-detection; and performing RF sub-band de-multiplexing for ultra-wide band optical digital coherent detection.

The system utilizes RF frequency mixing to down-convert both the in-phase and quadrature parts of the photo-detected electrical RF band signal to baseband for data conversion. By controlling the mixing phase of the electrical LO, the RF mixing modules can precisely select one of the RF sub-bands, either at the positive side or negative side relative to the optical carrier, to be down-converted to baseband after coherent photo-detection. The method allows sharing of coherent mixer, laser, and balanced photo-detectors for two or more sets of RF sub-bands to tackle optical channel containing multiple RF sub-bands for high baud-rate operation. Each RF sub-band will be down converted to baseband signals separately for parallel ADC sampling with lower bandwidth requirement.

Advantages of the system may include one or more of the following. The system converts a set of wide-band electrical signals containing multiple RF sub-bands (after coherent detection) to multiple sets of baseband electrical signals to allow the sharing of coherent mixers, balanced photo-detectors, and lasers to reduce receiver cost. The approach does not require high speed ADC for data conversion, thus capable of handling large symbol rate operation per optical carrier signal by using the existing DSP cores designed for 100G/200G. This advantage will help avoiding the high cost associated with developing large scale ASIC at even higher operating speed, which could also potentially increase the level of power consumption. The method is also modulation format independent so it is much more flexible and can be adopted for different system design with specific spectral efficiency or reach requirements. How each RF sub-band signal is generated at the transmitter in the beginning also does not affect its operation.

BRIEF DESCRIPTION OF THE DRAWINGS

The drawing and figures depict one or more implementations in accord with the present concepts, by way of example only, not by way of limitations. In the figures, like reference numerals refer to the same or similar elements.

DESCRIPTION

Figure 1A:
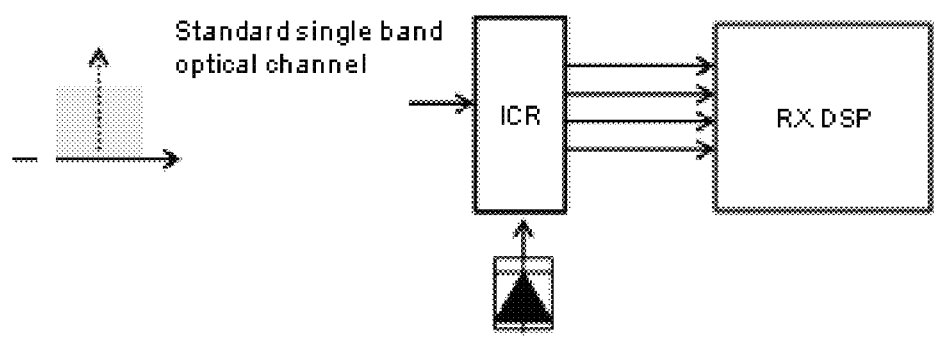
FIG. 1A shows an exemplary schematic of a standard digital coherent detection for standard single band optical channel.
Figure 1B:
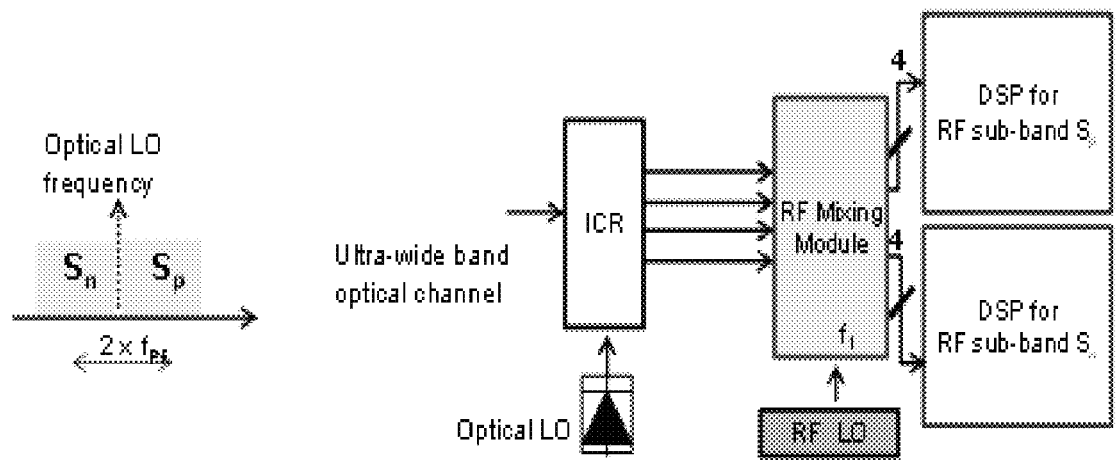
FIG. 1B shows an exemplary RF sub-band de-multiplexing for ultra-wide band optical digital coherent detection.

In FIGS. 1A-1B, we illustrate and compare two different schematics for digital coherent detection, one without RF sub-band de-multiplexing in FIG. 1A and another one with the sub-band de-multiplexer inserted in FIG. 1B. In the standard approach, only one single optical band is detected using a standard integrated coherent receiver which contains polarization-diversity coherent mixer, balanced photo-diodes, and trans-impedance amplifiers (TIAs). Homodyne detection is done by placing the optical LO at the center of received band thus the four down-converted electrical lanes represent the in-phase and quadrature components in the X and Y polarizations:

$$I_x' = Re(S_x)\cdot\cos\theta + Re(S_y)\cdot\sin\theta \quad (1)$$

$$Q_x' = Im(S_x)\cdot\cos\theta + Im(S_y)\cdot\sin\theta \quad (2)$$

$$I_y' = -Re(S_x)\cdot\sin\theta + Re(S_y)\cdot\cos\theta \quad (3)$$

$$Q_y' = -Im(S_x)\cdot\sin\theta + Im(S_y)\cdot\cos\theta \quad (4)$$

where $\theta$ is the angle of polarization orientation at the receiver side with respect to the transmitter side, and $S_x$ and $S_y$ is the down-converted complex baseband signals:

$$S_x = (I_x + jQ_x)\cdot e^{j2\pi(fTX-fRX)t} \quad (5)$$

$$S_y = (I_y + jQ_y)\cdot e^{j2\pi(fTX-fRX)t} \quad (6)$$

where $f_{TX}$ and $f_{RX}$ are the frequencies for the transmitter laser and the receiver LO, respectively. Typically, only one optical signal band can be detected using this scheme because the bandwidth limitation of the ADC and DSP design.

In the system as shown in FIG. 1B, an ultra-wide band optical channel with multiple RF sub-bands can be detected using one set of ICR (or other coherent detection apparatus) with the aid of RF sub-band de-multiplexing via the RF mixing module. For the ease of explanation, we will focus our case on the operation of down-converting and de-multiplexing one optical channel containing two RF sub-bands. The scheme, however, can be generalized to allocate more input signals by using more parallel RF up-conversions with different RF LO frequencies.

Figure 2:
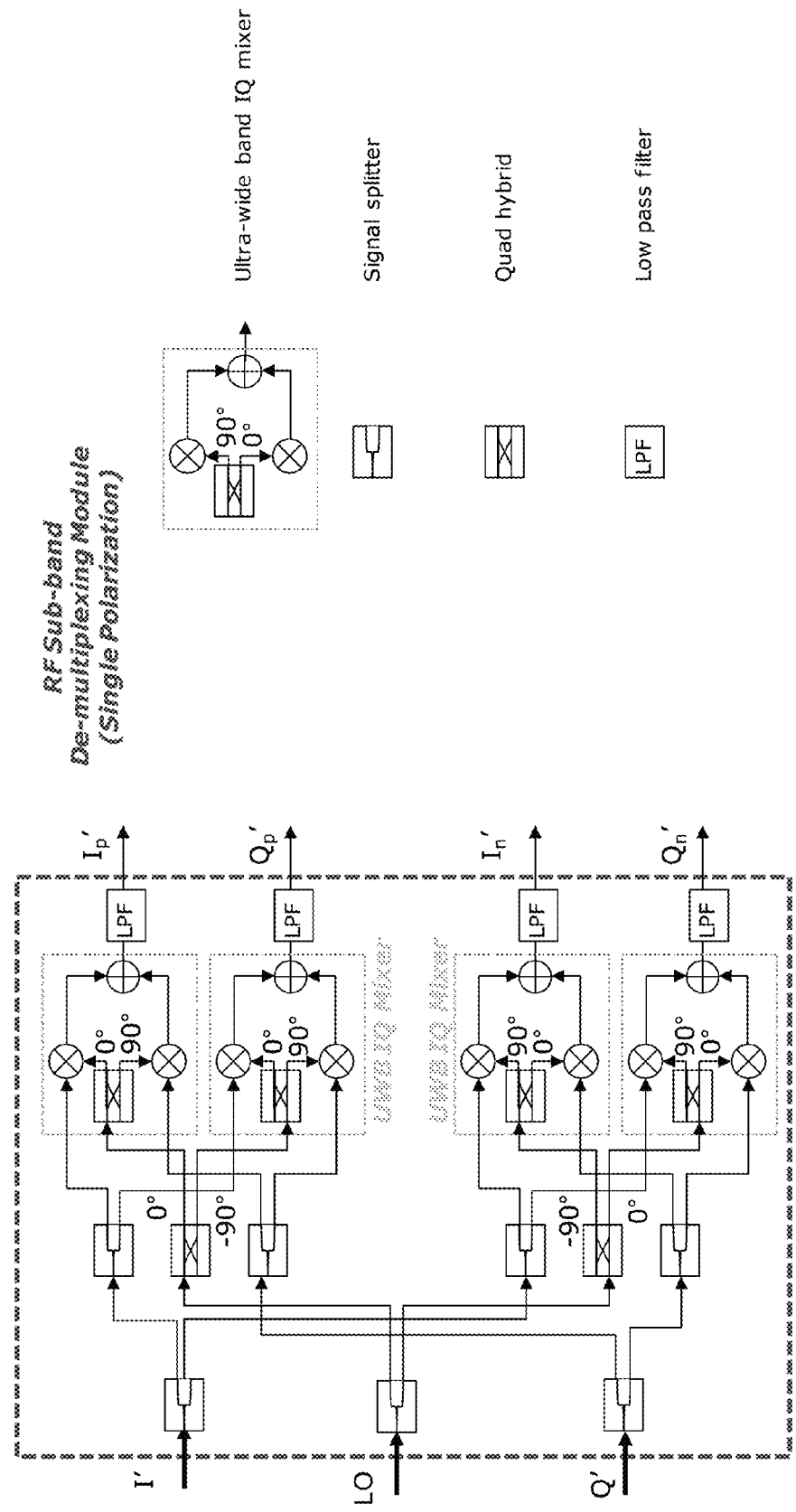
FIG. 2 shows an exemplary structure of RF mixing module for sub-band de-multiplexing, shown for one polarization.
Figure 3:
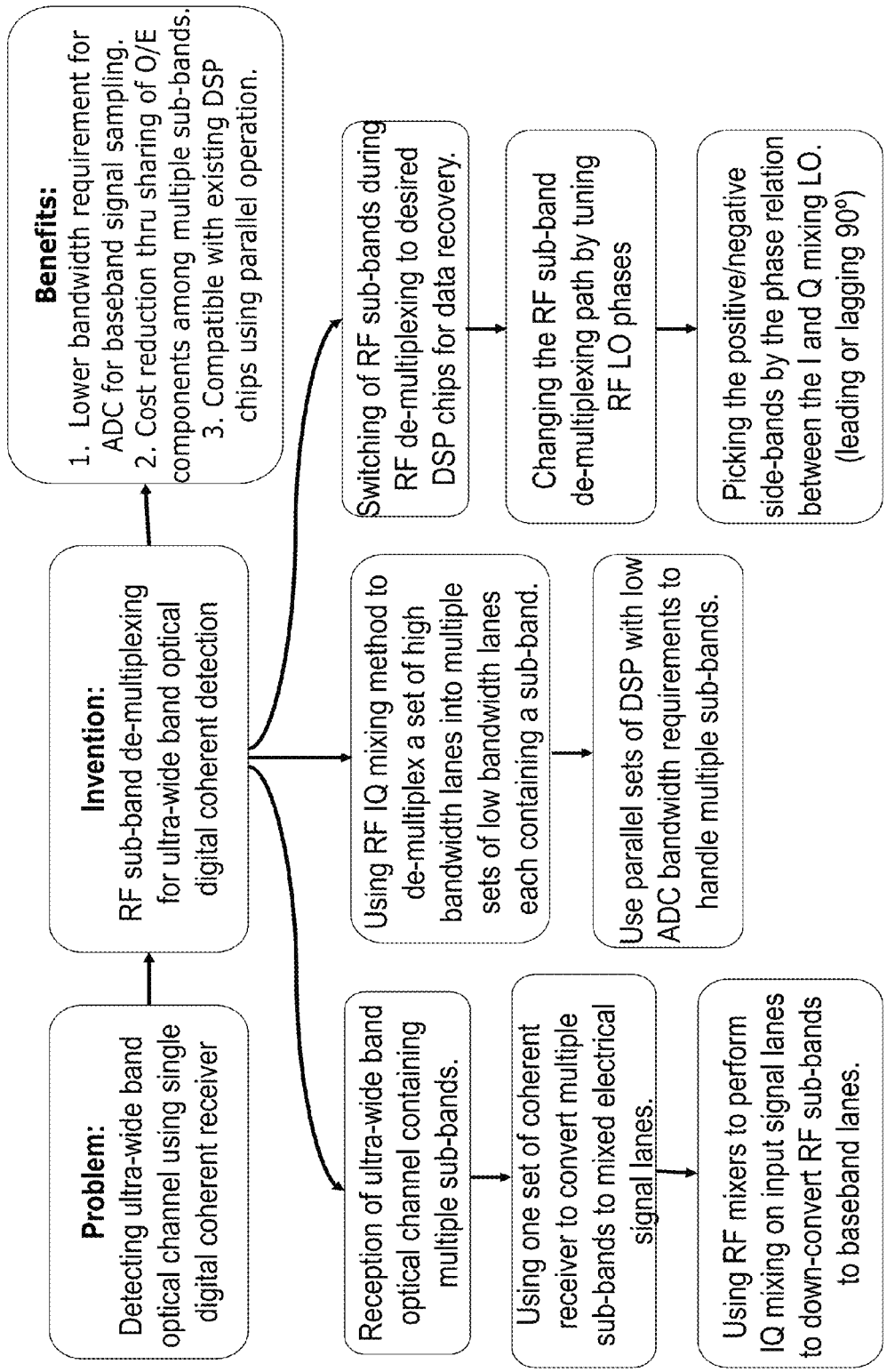
FIG. 3 shows an exemplary system for performing RF sub-band de-multiplexing for ultra-wide band optical digital coherent detection.

FIG. 2 shows an exemplary structure of RF mixing module for sub-band de-multiplexing, shown for one polarization. For the two RF sub-band operation, the optical LO will be placed in between the two RF sub-band in this case to reduce bandwidth requirement for the ICR. The RF mixing module, with its internal detail design shown in FIG. 2, will take the four coherently detected electrical inputs and further convert them to two sets of four baseband electrical signals for separate data conversion and recovery using two DSP modules. Here the down-conversion and de-multiplexing process will be discussed for X-polarization, knowing that the Y-polarization processing is exactly the same. The two input signals to the RF sub-band de-multiplexing module contains both the positive sideband $S_p$ and the negative side band $S_{n\_x}$:

$$S_x' = (I_x' + jQ_x') = (S_{p\_x} e^{j\omega RFt} + S_{n\_x} e^{-j\omega RFt}) \cdot \cos\theta + (S_{p\_y} e^{j\omega RFt} + S_{n\_y} e^{-j\omega RFt}) \cdot \sin\theta \quad (7)$$

$\omega_{RF}$ is half of the frequency separation between $S_{p\_x}$ and $S_{n\_x}$. In order to down-convert $S_{p\_x}$ to baseband for ADC sampling, a left shift by:

$$S_x' \cdot e^{-j\omega_{RF}t} = (I_x' + jQ_x') \cdot e^{-j\omega_{RF}t} = \quad (8)$$
$$(S_{p\_x} + S_{n\_x} e^{-j2\omega_{RF}t}) \cdot \cos\theta + (S_{p\_y} + S_{n\_y} e^{-j2\omega_{RF}t}) \cdot \sin\theta$$

Thus $S_{p\_x}$ can be obtained after low pass filtering to remove $S_{n\_x}$. However, equation (8) involves complex operation. In analog electronics, the relationship can be represented in real values by writing out the in-phase and quadrature signals:

$$I_{p\_x} = LPF[\text{Re}(S_x' \cdot e^{-j\omega_{RF}t})] = \quad (9)$$
$$LPF\{\text{Re}[I_x' + jQ_x'] \cdot (\cos\omega_{RF}t - j \cdot \sin\omega_{RF}t)\} =$$
$$LPF(I_x' \cos\omega_{RF}t + Q_x' \sin\omega_{RF}t)$$

$$Q_{p\_x} = LPF[\text{Im}(S_x' \cdot e^{-j\omega_{RF}t})] = LPF(-I_x' \sin\omega_{RF}t + Q_x' \cos\omega_{RF}t) \quad (10)$$

$$I_{n\_x} = LPF[\text{Re}(S_x' \cdot e^{j\omega_{RF}t})] = LPF(I_x' \cos\omega_{RF}t - Q_x' \sin\omega_{RF}t) \quad (11)$$

$$Q_{n\_x} = LPF[\text{Im}(S_x' \cdot e^{j\omega_{RF}t})] = LPF(I_x' \sin\omega_{RF}t + Q_x' \cos\omega_{RF}t) \quad (12)$$

From (9)-(10), we observe that the in-phase and quadrature components for the same sideband can be obtained separately by rotating the mixing LO phases by 90 degrees, while maintaining the phase difference between the two beating arms at 90 degrees. The difference in the down-conversion of the positive or negative sideband is that in the positive sideband down-conversion, I mixing arm phase is lagging by 90 degrees while it is leading by 90 degrees for the negative sideband down-conversion. The operation of equation (9)-(12) can be implemented by components connected as shown in FIG. 2. By writing out the complete expression for $I_x'$ and $Q_x'$:

$$I_x' = \text{Re}[S_{p\_x} e^{j\omega RFt} + S_{n\_x} e^{j\omega RFt}] \cdot \cos\theta + \text{Re}[S_{p\_y} e^{j\omega RFt} + S_{n\_y} e^{j\omega RFt}] \cdot \sin\theta = \{[\text{Re}(S_{p\_x}) + \text{Re}(S_{n\_x})] \cdot \cos\omega_{RF}t + [-\text{Im}(S_{p\_x}) + \text{Im}(S_{n\_x})] \sin\omega_{RF}t\} \cos\theta + \{[\text{Re}(S_{p\_y}) + \text{Re}(S_{n\_y})] \cdot \cos\omega_{RF}t + [\text{Im}(S_{p\_y}) + \text{Im}(S_{n\_y})] \sin\omega_{RF}t\} \cdot \sin\theta \quad (13)$$

$$Q_x' = \text{Im}[S_{p\_x} e^{j\omega RFt} + S_{n\_x} e^{j\omega RFt}] \cdot \cos\theta + \text{Im}[S_{p\_y} e^{j\omega RFt} + S_{n\_y} e^{j\omega RFt}] \cdot \sin\theta = \{[\text{Im}(S_{p\_x}) + \text{Im}(S_{n\_x})] \cdot \cos\omega_{RF}t + [-\text{Re}(S_{p\_x}) + \text{Re}(S_{n\_x})] \sin\omega_{RF}t\} \cos\theta + \{[\text{Im}(S_{p\_y}) + \text{Im}(S_{n\_y})] \cdot \cos\omega_{RF}t + [\text{Re}(S_{p\_y}) + \text{Re}(S_{n\_y})] \sin\omega_{RF}t\} \cdot \sin\theta \quad (14)$$

and placing into (9)-(10), we obtained:

$$I_{p\_x}' = \text{Re}(S_{p\_x}) \cdot \cos\theta + \text{Re}(S_{p\_y}) \cdot \sin\theta \quad (15)$$

$$Q_{p\_x}' = \text{Im}(S_{p\_x}) \cdot \cos\theta + \text{Im}(S_{p\_y}) \cdot \sin\theta \quad (16)$$

Comparing the results with equation (1) and (2), we can conclude that the de-multiplexed and down-converted baseband signals are essentially the same as the ones obtained by down-converting one sideband using standard homodyne coherent detection. The derivation for negative side band and for Y-polarization signal lanes can be done in similar way.

The two sets of down-converted/de-multiplexed baseband signal outputs now have at least half the bandwidth as the input signal. Therefore it reduces the requirement on the ADC bandwidth and receiver DSP speed for signal processing, allowing a high baud-rate optical channel to be parallel processed by two or more DSP chips. For example, single receiver 400G reception can be achieved by de-multiplexing two 32 Gbaud RF sub-bands with standard 200G DP-16QAM formats.

The solution provides a method of detecting ultra-wide band optical channel containing multiple signal bands using only one set of coherent receiver front-ends. This approach is different than previous single receiver digital coherent detection techniques for ultra-high data-rates with requirements of high ADC bandwidths and DSP speed. In the system, after photo-detecting the four signal lanes of the incoming optical channel, where the signals from multiple bands are mixed together, we utilize an RF de-multiplexer module to down-convert the input lanes to separate subsets of lanes for each band. The RF-de-multiplexer performs mixing operation on multiple inputs in a special arranged setting to produce multiple output lanes. Each produced subset of lanes from the RF de-multiplexer is identical to those produce by a standard digital coherent receiver and can be sampled by ADC with lower bandwidths and passed to standard DSP for data recovery.

Combined with our previous system entitled "Ultra-wide band signal generation using digitally jointed dual sidebands and RF up-conversion for single optical carrier transmission," with Ser. No. 14/689,094, the content of which is incorporated by reference, our approaches provides a pathway to support ultra-high data transport using only one optical carrier with single set of TX/RX frontend components and multiple DSP cores. This is a complete new architecture for optical channels with parallel processing as previously the standard method is to use multi-carrier transmission where each signal band is support by a set of transceiver frontends and DSP core. In the system, only DSP cores are specifically assigned for each signal band while the transceiver frontends are shared among multiple signal bands for cost reduction and space saving.

By sharing the receiver front-ends components among multiple sub-bands, the system can provide cost-saving came from using fewer coherent mixers, photo-diodes, TIAs, or the packaged ICRs. The complexity and cost of added RF de-multiplexer module, which contains strictly passive components, can be addressed by integrating the module in a single package that is smaller in size than a packaged ICR. The de-multiplexing approach can operate on any form of electrical signal and is modulation format independent. Thus it is compatible to any currently available DSP chips and future-proof to new generations of DSP chips for digital coherent detection.

The de-multiplexed signal lanes for each sub-bands will have much lower bandwidth than the mixed signal input lanes at the coherent receiver outputs. Thus, high data-rate transmission can be supported using parallel approach without adding multiple RX front-ends and increasing ADC bandwidth, which is crucial as redesigning DSP chips for digital coherent fiber transmission system is a large investment.

Aspects of the systems and methods provided herein encompass hardware and software for controlling the relevant functions. Software may take the form of code or executable instructions for causing a DSP or other programmable equipment to perform the relevant steps, where the code or instructions are carried by or otherwise embodied in a medium readable by the processor or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

What is claimed is:

1. A method for data transmission, comprising radio frequency (RF) mixing to down-convert in-phase and quadrature parts of a photo-detected electrical RF band signal to baseband for data conversion;
  controlling a mixing phase of an electrical local oscillator (LO) at one or more RF mixing modules;
  selecting one of the RF sub-bands to be down-converted to baseband after coherent photo-detection; and
  performing RF sub-band de-multiplexing for ultra-wide band optical digital coherent detection; and
  providing LO phase control to perform sub-band de-multiplexing without the use of baseband signal inversion to minimize unmatched signal path and using LO phase control to perform sub-band switching.

2. The method of claim 1, comprising receiving ultra-wide band optical channel containing a plurality of sub-bands.

3. The method of claim 1, comprising using one set of coherent receivers to convert multiple sub-bands to mixed electrical signal lanes.

4. The method of claim 1, comprising using RF mixers to perform IQ mixing on input signal lanes to down-convert RF sub-bands to baseband lanes.

5. The method of claim 1, comprising using RF IQ mixing to de-multiplex a set of high bandwidth lanes into multiple sets of bandwidth lanes each containing a sub-band.

6. The method of claim 1, comprising applying parallel sets of digital signal processors (DSPs) with analog to digital conversion bandwidth requirements to handle multiple sub-bands.

7. The method of claim 1, comprising switching RF sub-bands during RF de-multiplexing to predetermined DSP for data recovery.

8. The method of claim 1, comprising picking positive or negative side-bands by a phase relationship between I and Q.

9. The method of claim 1, comprising obtaining in-phase and quadrature components for a sideband by rotating mixing LO phases by 90 degrees, while maintaining a phase difference between two beating arms at 90 degrees.

10. The method of claim 1, wherein during a positive sideband down-conversion, an I mixing arm phase lags by 90 degrees while the I mixing arm phase leads by 90 degrees for a negative sideband down-conversion.

11. The method of claim 1, comprising de-multiplexing a positive sideband $S_{p\_x}$ and a negative side band $S_{n\_x}$ with a relationship:

$$S_x' = (I_x' + jQ_x') = (S_{p\_x}e^{j\omega RFt} + S_{n\_x}e^{-j\omega RFt}) \cdot \cos\theta + (S_{p\_y}e^{j\omega RFt} + S_{n\_y}e^{-j\omega RFt}) \cdot \sin\theta.$$

12. The method of claim 1, comprising down-converting one sideband using homodyne coherent detection.

13. The method of claim 1, wherein the selecting one of the RF sub-bands comprises choosing either at a positive side or a negative side relative to an optical carrier.

14. The method of claim 1, comprising sharing coherent mixer, laser, and balanced photo-detectors for two or more sets of RF sub-bands to de-multiplex an optical channel containing multiple RF sub-bands.

15. The method of claim 1, wherein each RF sub-band is down converted to baseband signals separately for parallel analog to digital sampling with a bandwidth requirement.

* * * * *